March 16, 1943.    L. W. CHUBB    2,313,923
MEASUREMENT OF TORQUE AND POWER TRANSMITTED BY SHAFTING
Filed Nov. 4, 1939    2 Sheets-Sheet 1

WITNESSES:
E. F. Oberheim.
Wm. J. Ruano

INVENTOR
Lewis W. Chubb.
BY
Paul E. Friedemann
ATTORNEY

March 16, 1943.　　　L. W. CHUBB　　　2,313,923
MEASUREMENT OF TORQUE AND POWER TRANSMITTED BY SHAFTING
Filed Nov. 4, 1939　　　2 Sheets-Sheet 2
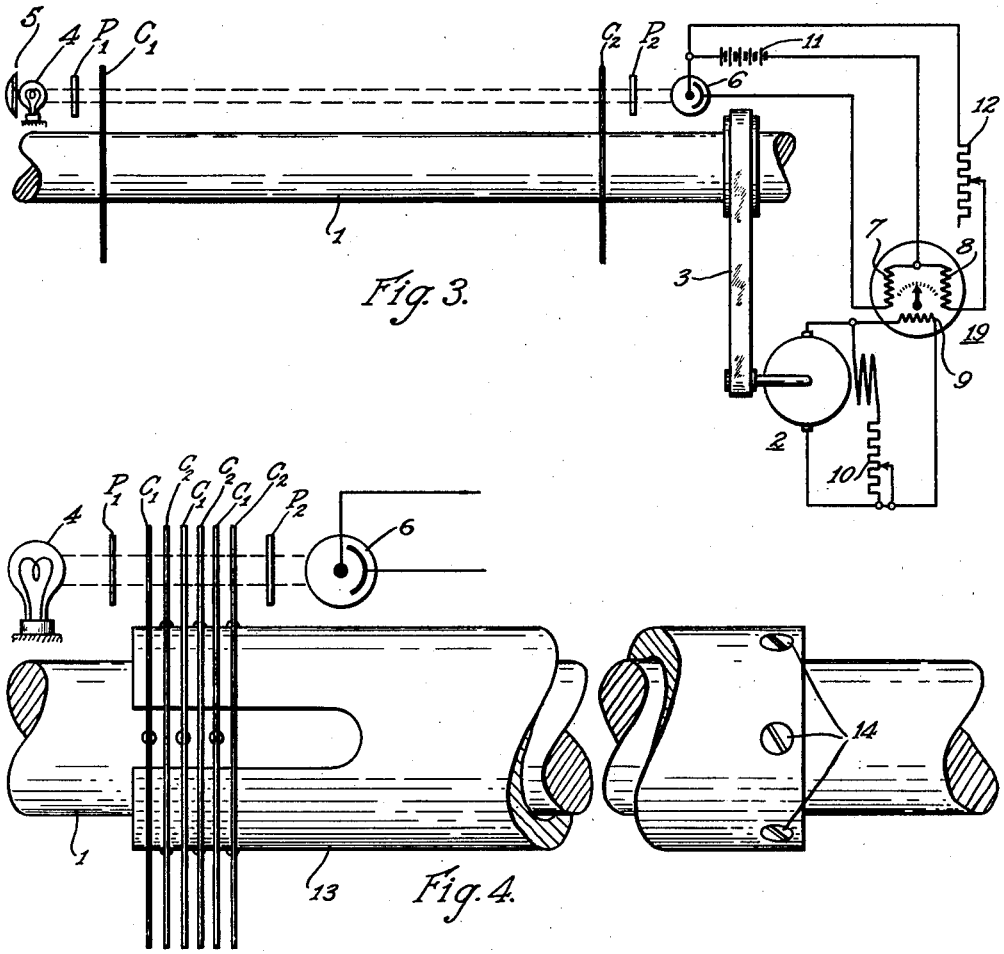
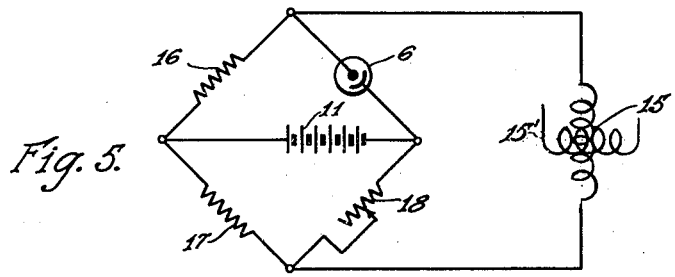
WITNESSES:　　　　　　　　　　　　　INVENTOR
　　　　　　　　　　　　　　　　　　Lewis W. Chubb.
　　　　　　　　　　　　　　　　　　BY
　　　　　　　　　　　　　　　　　　ATTORNEY Patented Mar. 16, 1943

2,313,923

UNITED STATES PATENT OFFICE 2,313,923

MEASUREMENT OF TORQUE AND POWER TRANSMITTED BY SHAFTING

Lewis W. Chubb, Pittsburgh, Pa., assignor to Westinghouse Electric & Manufacturing Company, East Pittsburgh, Pa., a corporation of Pennsylvania Application November 4, 1939, Serial No. 302,893

17 Claims. (Cl. 265—25)

My invention relates to apparatus for measuring the torque or horsepower delivered by a drive shaft or power shaft.

In the past, schemes have been proposed for testing, recording, or indicating the torque or horsepower in power shafts. However, they have been, in most cases, very complicated and impractical.

An object of my invention is to provide a scheme for measuring the torque or horsepower delivered by a power shaft involving the use of polarized light, which scheme is simple, requiring no slip rings or mechanical connections, and is highly reliable in operation.

Other objects and advantages will become more apparent from a study of the following specification when considered in conjunction with the accompanying drawings, in which:

Fig. 3 is a diagrammatic showing of an apparatus for measuring the power transmitted by a drive shaft;

Fig. 4 shows a modification of the optical system shown in Fig. 3; and

Fig. 5 is a schematic showing of a modified form of connecting a standard wattmeter for use in apparatus such as shown in Fig. 3.

Figure 1:
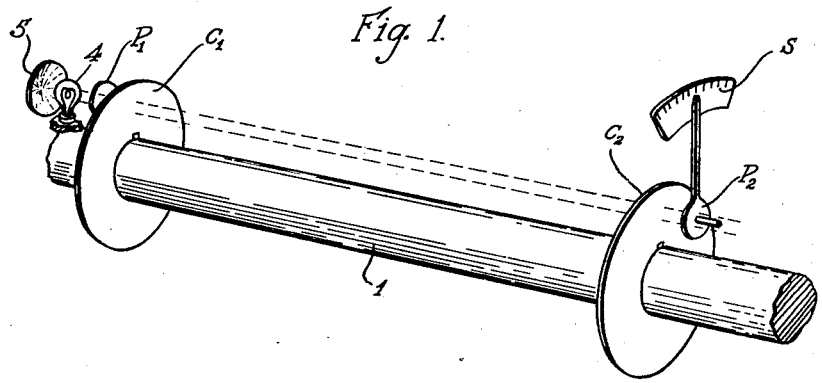
Figure 1 is a perspective showing of an apparatus for measuring the torque developed by a drive shaft involving the principles of my invention.

Referring more particularly to Figure 1, numeral 1 denotes a power shaft or drive shaft which is driven by a driving motor or engine, or other driving means (not shown). Inasmuch as shaft 1 is delivering power, it will be twisted in an amount proportional to its torque. A light source 4, which is preferably monochromatic, is equipped with a reflector 5 which projects a parallel beam of light substantially parallel with the axis of the drive shaft 1. A polarizer $P_1$ such as a Nicol prism or Polaroid material is used to change the light to plane polarized light. A one-half wave plate $C_1$, which is made of Cellophane, cellulose nitrate, cellulose xanthate, or other birefringent material is rigidly fastened to and rotates with shaft 1. When light enters a birefringent (or doubly refractive) crystal such as Cellophane in a direction not parallel to the optical axis, the incident vibration is decomposed into two mutually perpendicular components which travel through the crystal with different velocities. If the thickness of the birefringent material is such that these components emerge out of phase by one-half wave length, it is regarded as a one-half wave plate for the particular light used. A second disc-like plate $C_2$, similar to plate $C_1$ is fastened to another portion of shaft 1 at a suitable distance from plate $C_1$. A second polarizing screen $P_2$, similar to $P_1$, is used as an analyzer. Between $P_1$ and $C_1$ there is plane polarized light with the plane of polarization stationary.

Between $C_1$ and $C_2$ there is plane polarized light with the plane of polarization rotating at twice the angular velocity of the shaft. Between $C_2$ and $P_2$ the plane of polarization is again standing still and has an azimuth depending upon the relative positions of the optical axes of $P_1$, $C_1$ and $C_2$. The twist of the shaft changes the relative azimuth of the axes of $C_1$ and $C_2$, and it can be shown that the plane of polarization beyond $C_2$ is shifted by twice the angle of twist of the shaft between $C_1$ and $C_2$. Suppose that lamp 4 emits a yellow light and that $P_1$ has its plane of polarization vertical and that $C_1$ and $C_2$ are one-half wave discs for yellow light, with their optical axes parallel when there is no torque on the shaft, and further suppose that $P_2$ has its plane of polarization horizontal. Under this condition, the plane of polarization between $C_2$ and $P_2$ is vertical and the light will be cut off by the analyzer $P_2$. If now the shaft is loaded so as to have a twist of $\theta$ between the rotating discs $C_1$ and $C_2$, the plane of polarization beyond $C_2$ will be shifted by the angle $2\theta$. This angle can be determined by rotating $P_2$ about its own axis through an angle to get extinction. This is then a measure of the torque in the rotating shaft. By knowing the shift of plane beyond $C_2$ and the calibration constant of the shaft, the torque may be figured and may be read from a suitably calibrated stationary scale S. This torque multiplied by a constant and the speed of the shaft will be the power delivered.

Figure 2:
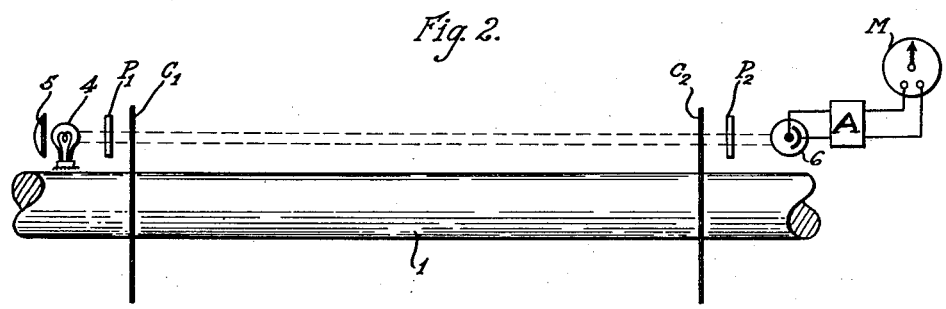
Fig. 2 is a modification of the torque measuring scheme of Fig. 1.

Fig. 2 shows a modified form of torque measuring scheme involving a photo-tube 6, an amplifier A and indicating meter M, which meter reads the current flowing through the photo-tube and which current is proportional to the torque transmitted through the drive shaft.

The intensity of light beyond $P_2$ is $\sin^2\theta$ where $\theta$ is the angle of shift of the plane of polarization.

$$\sin^2\theta = \frac{1}{2} - \frac{1}{2}\cos 2\theta; \text{ where } \theta = \frac{\pi}{4}$$

This function passes through a point of inflection and the light transmitted is proportional to the angular shift (for small changes of angle). If this variation is placed on one winding of a direct current wattmeter and the other coil is fed from a direct current generator having a voltage proportional to the shaft speed, the wattmeter will read power variations from a mean value and can be corrected and calibrated to read horsepower directly.

Referring more particularly to Fig. 3, drive shaft 1 is coupled to a generator 2 by any suitable coupling means, such as a belt 3. Wattmeter 19 has two twin wound stationary coils 7 and 8 and a moving coil 9. Generator 2, which is driven by shaft 1, is regulated by a variable resistor 10. Battery 11 feeds coil 7 through the photo-tube 6 by current proportional to the illumination falling upon the photo-tube. The azimuth of the polarizers $P_1$ and $P_2$ and the birefringent discs $C_1$ and $C_2$ are arranged so that the light falling on photo-cell $P_2$ is one-half of the maximum illumination when the shaft is subject to zero torque. Coil 8 carries a current equal to the current through the photo-tube at zero torque, magnetically opposed to coil 7. The current through coil 8 is adjusted by variable resistor 12. Thus at zero torque, the current in coils 7 and 8 cancels magnetically. As the light falls upon photo-tube 6, the current in coil 7 varies proportionately and becomes greater or lesser than the current in coil 8. The residual magnetic field multiplied by the field of coil 9 (which is proportional to the speed of the drive shaft 1) will give the power. An alternate wattmeter scheme would be to make the coils 7 and 8 the movable elements of the wattmeter and coil 9 the stationary element. Of course the wattmeter 19 is suitably calibrated in horsepower or any other units of power.

Fig. 4 shows a modification of the optical system shown in Fig. 1. The scheme illustrated in Fig. 4 is primarily for the purpose of increasing the sensitivity which is achieved by providing the multiple effect of several birefringent discs. A sleeve 13 telescopically fits over shaft 1 and is fastened to it by any suitable means, such as bolts 14, at the right-hand of the tube. At the left-hand end, the sleeve is free to rotate on the shaft 1. Three discs, each denoted by $C_1$ of one-half wave plates, and three discs denoted by $C_2$ in alternate relationship correspond to the discs $C_1$ and $C_2$ described in Fig. 1. The three discs $C_2$ are rigidly connected to sleeve 13. Any twist in the measured length of the shaft 1 by torque will cause an annular shift between the members $C_1$ and $C_2$. Since there are three pairs of birefringent discs for each unit of twist of the shaft, there will be six units of twist in the polarized beam of light beyond the last member $C_2$. Torque and power can thus be measured or indicated with three times the sensitivity as that obtained in the scheme shown in Fig. 1.

While only an indicating means has been shown, it is obvious that, if desirable, recording means may also be employed. Furthermore, there are many alternative methods of calibrating and adjusting the elements, such as the lights, angles of repose and resistors which will be obvious to those skilled in the art.

For example, referring more particularly to Fig. 5, a standard wattmeter with one stationary and one movable coil may be used by using the bridge connection shown in this figure. Numeral 15 denotes the stationary coil and 15' the movable coil. Numerals 16, 17 and 18 denote the resistance legs of the bridge and 11 is the battery.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims.

I claim as my invention:

1. Apparatus for measuring a quantity which is a function of angular displacement of two longitudinally disposed, angularly displaceable elemental portions of a drive shaft means comprising, in combination, a polarized source of light mounted adjacent one of said elemental portions so as to throw a beam adjacent the other of said elemental portions, a pair of fractional wave plates of birefringent material, one secured to each of said elemental portions and through which said beam is transmitted, a polarizing screen associated with the birefringent plate which is furthermost from said light source and which acts as an analyzer, indicating means associated with said last mentioned birefringent plate for measuring a quantity which is a function of the angular displacement of said two angularly displaceable elemental portions.

2. Apparatus for measuring the horsepower delivered by a drive shaft comprising a drive shaft, a polarized source of light mounted adjacent a portion of said shaft so as to throw a beam substantially parallel to the shaft axis, a pair of ½ wave plates of birefringent material secured to spaced portions of said shaft and through which said beam is transmitted, a polarizing screen associated with the birefringent plate which is furthermost from said light source and which polarizing screen acts as an analyzer, means associated with said last mentioned polarizing screen for measuring the amount of horsepower transmitted by said shaft, said last mentioned means including a phototube, a direct-current generator driven by said drive shaft, a wattmeter having a double coil unit of magnetically opposed coils and a single coil unit, said units being relatively movable with respect to each other, one of the coils of said double coil unit being variably energized by light falling upon said phototube and the single coil unit being energized by said direct-current generator, therefore rendering said wattmeter, when suitably calibrated, effective to read the developed horsepower delivered by said drive shaft.

3. Apparatus for measuring the horsepower delivered by a drive shaft comprising a drive shaft, a polarized source of light mounted adjacent a portion of said shaft so as to throw a beam substantially parallel to the shaft axis, a pair of ½ wave plates of birefringent material secured to spaced portions of said shaft and through which said beam is transmitted, a polarizing screen associated with the birefringent screen which is furthermost from said light source and which polarizing screen acts as an analyzer, means associated with said last mentioned polarizing screen for measuring the amount of horsepower transmitted by said shaft, said last mentioned means including a phototube, a direct-current generator driven by said drive shaft, a wattmeter having two stationary coils and a movable coil, a source of potential and a resistor connected in series with one of said stationary coils, said source of potential and said phototube being connected in series with the other stationary coil, said movable coil being connected to the terminals of said generator, thereby providing a meter, which when suitably calibrated, will indicate the horsepower developed by said drive shaft.

4. Apparatus for measuring the power delivered by a drive shaft, comprising a drive shaft, a polarized source of light mounted adjacent a portion of said shaft so as to throw a beam substantially parallel to the shaft axis, a plurality of ½ wave plates of birefringent material secured to axially spaced portions on said shaft in such position to be in the path of said beam, an equal number of similar ½ wave plates of birefringent material alternately disposed between said first mentioned ½ wave plates to thus also be in the path of said beam, mounting means for said last-mentioned ½ wave plates rigidly secured to said shaft, means including a polarizing screen associated with the plate furthermost from said light source and disposed in the normal path of said beam for measuring the power transmitted by said shaft.

5. Apparatus for measuring the horsepower delivered by a drive shaft comprising a drive shaft, a polarized source of light mounted adjacent a portion of said shaft so as to throw a beam of light substantially parallel to the shaft axis, a plurality of ½ wave plates of birefringent material secured to axially spaced portions on said shaft in such position to be in the path of said beam, an equal number of similar plates alternately disposed between said first mentioned ½ wave plates to thus also be in the path of said beam, mounting means for said last-mentioned ½ wave plates rigidly secured to said shaft, means including a polarizing screen associated with the plate furthermost from said light source and disposed in the normal path of said beam for measuring the power transmitted by said shaft, said means also including a phototube, a direct current generator driven by said drive shaft, a wattmeter having two stationary coils and a movable coil, one of said stationary coils being variably energized by light falling upon said phototube and the movable coil being energized by said direct-current generator, therefore rendering said wattmeter, when suitably calibrated, effective to read the developed horsepower delivered by said drive shaft.

6. Apparatus for measuring the horsepower delivered by a drive shaft comprising a drive shaft, a polarized source of light mounted adjacent a portion of said shaft so as to throw a beam substantially parallel to the shaft axis, a sleeve which telescopically fits over said shaft and has one end rigidly secured thereto and the other end free, a plurality of ½ wave plates of birefringent material secured to axially spaced portions of said sleeve at the free end and in such position that the said beam is transmitted through said plates, an equal number of similar ½ wave plates which are alternately disposed between said first mentioned plates and rigidly secured to the shaft and thus also in such position that said beam is transmitted through said second group of plates, a polarizing screen, associated with the ½ wave plate which is furthermost from said light source and also positioned in the path of said beam, acting as a beam analyzer, means associated with said last-mentioned polarizing screen for measuring the amount of power transmitted by said shaft, said last mentioned means including a phototube in the path of the beam, a direct-current generator driven by said drive shaft, a wattmeter having two stationary coils and a movable coil, one of said stationary coils being variably energized by light falling upon said phototube and the movable coil being energized by said direct-current generator, therefore rendering said wattmeter, when suitably calibrated, effective to read the developed horsepower delivered by said drive shaft.

7. Apparatus for measuring the horsepower delivered by a drive shaft comprising a drive shaft, a polarized source of light mounted adjacent a portion of said shaft so as to throw a beam substantially parallel to the shaft axis, a sleeve which telescopically fits over said shaft and has one end rigidly secured thereto and the other end free of said drive shaft, a plurality of ½ wave plates of birefringent material secured to spaced portions of said sleeve along the axis thereof and disposed in the path of said beam, an equal number of similar ½ wave plates alternately disposed between said first mentioned ½ wave plates and thus also in the path of said beam, mounting means for said last-mentioned ½ wave plates rigidly secured to said shaft, means associated with the plate furthermost from said source of light for measuring the amount of power transmitted by said shaft, said last mentioned means including a phototube disposed in the beam path, a direct-current generator driven by said drive shaft, a wattmeter having an oppositely wound double coil unit and a single coil unit relatively movable thereto, one of the coils of said double coil unit being variably energized by light falling upon said phototube and the single coil unit being energized by said direct-current generator, therefore rendering said wattmeter, when suitably calibrated, effective to read the developed horsepower delivered by said drive shaft.

8. Apparatus for measuring the torque delivered by a drive shaft comprising a drive shaft, a polarized source of light mounted adjacent a portion of said shaft so as to throw a beam substantially parallel to the shaft axis, a pair of ½ wave plates of birefringent material secured to spaced portions of said shaft and through which said beam is transmitted, a polarizing screen associated with the birefringent plate which is furthermost from said light source and which acts as an analyzer, means including a phototube and a meter associated with said last mentioned polarizing screen for measuring the amount of torque transmitted by said shaft.

9. Apparatus for measuring the torque delivered by a drive shaft comprising a drive shaft, a polarized source of light mounted adjacent a portion of said shaft so as to throw a beam substantially parallel to the shaft axis, a plurality of ½ wave plates of birefringent material secured to spaced portions axially of said shaft in such position to be in the path of said beam, an equal number of ½ wave plates alternately disposed between said first mentioned ½ wave plates to thus also be in the path of said beam and adapted to be movable with respect to the first mentioned plates in an amount proportional to the torque transmitted, mounting means for said last-mentioned ½ wave plates rigidly secured to said shaft, means including a phototube in the path of said beam and a meter associated with said last mentioned birefringent plate for measuring the amount of torque transmitted by said shaft.

10. Apparatus for measuring a quantity which is a function of the twist or torque delivered by a drive shaft comprising, in combination, a drive shaft, a polarized source of light mounted adjacent said drive shaft, means including a pair of plates of birefringent material secured to longitudinally spaced points on said shaft and a polarizing screen through which said light beam is transmitted, and means for measuring said quantity which is a function of the intensity of the transmitted light beam.

11. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a plurality of plates of birefringent material secured to longitudinally spaced points on said shaft and a polarizing screen through which said light beam is transmitted, and means for measuring said quantity which is a function of the intensity of the transmitted light beam.

12. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a plurality of plates of birefringent material secured to spaced portions of said shaft and a polarizing screen through which said light beam is transmitted, and means for measuring said quantity which is a function of the intensity of the transmitted light beam.

13. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a pair of fractional wave plates of birefringent material so secured to spaced portions of said shaft to be in the path of said beam and a polarizing screen also disposed in the path of said beam through which said light beam is thus transmitted, and means disposed in the path of the beam but in position to receive the beam after it has passed said pair of plates and polarizing screen and responsive to the altered character of the light for measuring said quantity.

14. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a pair of plates of birefringent material secured to longitudinally spaced points on said shaft in the path of said beam and a polarizing screen also in the path of said beam through which said light beam is transmitted, said polarizing screen being manually rotatable so as to restore the transmissibility of the system to its initial value before the twist was applied to the drive shaft, a scale, and indicating means movable with said polarizing screen and with reference to said scale disposed adjacent thereto for determining the amount of said manual rotation, hence the amount of twist or torque of said drive shaft for measuring said quantity.

15. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a pair of fractional wave plates of birefringent material secured to longitudinally spaced points on said shaft in the path of said beam and a polarizing screen also in the path of said beam through which said light beam is transmitted, said polarizing screen being manually rotatable so as to restore the transmissibility of the system to its initial value before the twist was applied to the drive shaft, and indicating means movable with said polarizing screen for determining the amount of said manual rotation, hence the amount of twist or torque of said drive shaft for measuring said quantity.

16. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a pair of fractional wave plates of birefringent material and a polarizing screen through which said light beam is transmitted which plates are rigidly secured to longitudinally spaced portions of said drive shaft, together with a light meter for measuring the transmissibility of said plates and screen and the value of said quantity.

17. Apparatus for measuring a quantity which is a function of the twist or torque delivered by a drive shaft comprising, in combination, a drive shaft, a polarized source of light mounted adjacent said drive shaft so as to throw a beam longitudinally of said drive shaft, means including a plurality of pairs of fractional wave plates of birefringent material spaced along said shaft each pair being relatively movable by an amount proportional to the twist or torque developed by said drive shaft and a polarizing screen through which said light beam is transmitted, and means for measuring said quantity which is a function of the intensity of the transmitted light beam.

LEWIS W. CHUBB.